March 12, 1957 — N. L. MOULIN — 2,784,599
MECHANISM FOR CONVERTING ROTARY MOTION TO INTERMITTENT UNIDIRECTIONAL MOTION
Filed May 9, 1955

INVENTOR.
NORBERT LEO MOULIN.
BY
Lockwood, Galt, Woodard & Smith
ATTORNEYS.

United States Patent Office 2,784,599
Patented Mar. 12, 1957

2,784,599

MECHANISM FOR CONVERTING ROTARY MOTION TO INTERMITTENT UNIDIRECTIONAL MOTION

Norbert Leo Moulin, Fort Wayne, Ind., assignor to The Magnavox Company, Fort Wayne, Ind., a corporation Application May 9, 1955, Serial No. 506,939

2 Claims. (Cl. 74—84)

This invention relates generally to intermittent drive mechanisms, and more particularly to a gear locking mechanism adapted to provide intermittent drive motion.

The principal object of this invention is to provide an intermittent drive mechanism for intermittently feeding work to machines such as punch presses, riveting machines, milling machines, turret lathes and the like.

Another object of this invention is to provide a gear locking mechanism adapted to index at high speed and to rotate intermittently through a limited angle with a high degree of accuracy.

Still another object of this invention is to provide in a gear locking mechanism complying with the preceding objects and adapted to handle relatively heavy loads with a high degree of speed and accuracy.

In accordance with this invention there is provided a gear locking mechanism comprising a driven wheel, a drive wheel cooperating therewith, and a positive locking and unlocking device linked with the drive wheel for locking said driven wheel in a fixed position between drive periods.

The full nature of the invention will be understood from the accompanying drawings and the following description and claims:

Figure 1:
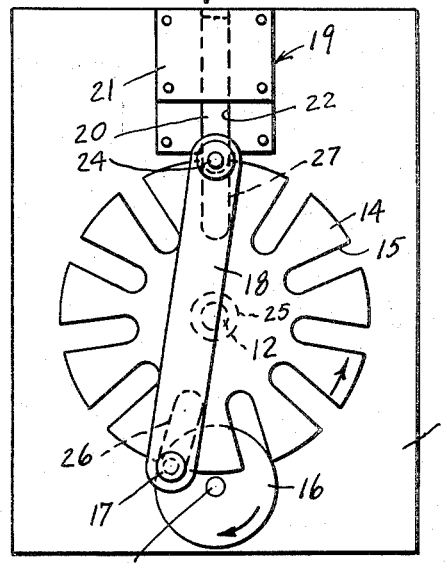
Figs. 1, 2, 3 and 4 are front elevations illustrating the mechanism of this invention in various phases of its operation.

In accordance with this invention there is provided a gear locking mechanism comprising a base plate 10 through which projects drive shaft 11, which may or may not be supported in base plate 10.

A driven shaft 12 projects through base plate 10 approximately centrally thereof, and may or may not be supported therein. A driven wheel 14 may be mounted on shaft 12 and includes a plurality of slots 15 disposed at equal angles with respect to one another.

A drive wheel 16 may be supported on shaft 11 and includes a crank pin 17 mounted adjacent the periphery thereof in any suitable fashion. A connecting strap or rod 18 may be connected to drive pin 17 and also to a locking bar 20 slideably mounted in a guide assembly 19, part of which comprises a guide plate 21. The locking bar reciprocates in a slot 22 in guide assembly 19 and is movable upwardly and downwardly by the connecting rod 18 into and out of the slots 15 in a driven wheel 14. Connecting rod 18 and the locking bar 20 are pivotally connected to one another by means of a pin 24.

It will be noted that a spacing washer 25 is mounted on the intermittently driven shaft 12 for locating the driven wheel 14 outwardly of and in overlapping relation to the drive wheel 16, and pin 17 is long enough to extend beyond the driven wheel 14. A drive pin 17 is located on a radius of the gear 16 such that it may enter slot 26, for example, of wheel 14. Assuming that the gear 16 rotates in a clockwise direction, the drive pin 17 entering slot 26 simultaneously moves locking bar 20 upwardly out of slot 27, unlocking the wheel 14. As drive wheel 16 continues its rotation from the position shown in Fig. 1 to those shown in Figs. 2 and 3, locking bar 20 stays out of contact with wheel 14, and this wheel rotates through a predetermined angle between adjacent slots.

Figure 2:
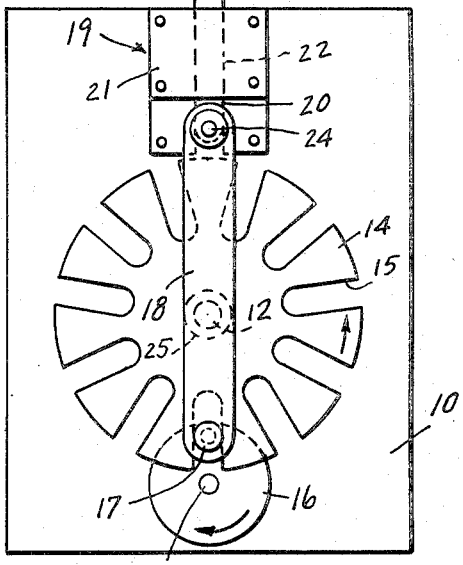
Figure 3:
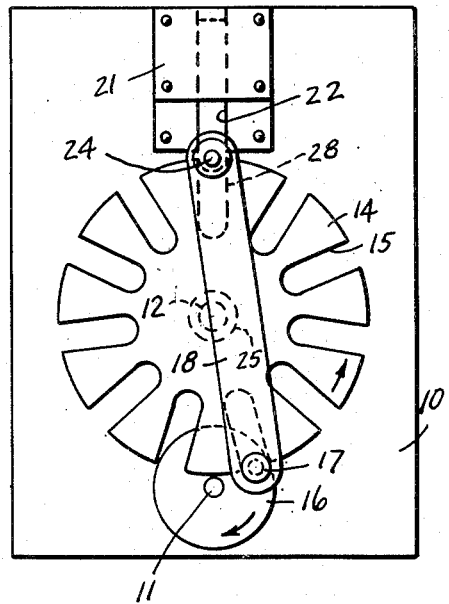
Figures 4, 5:
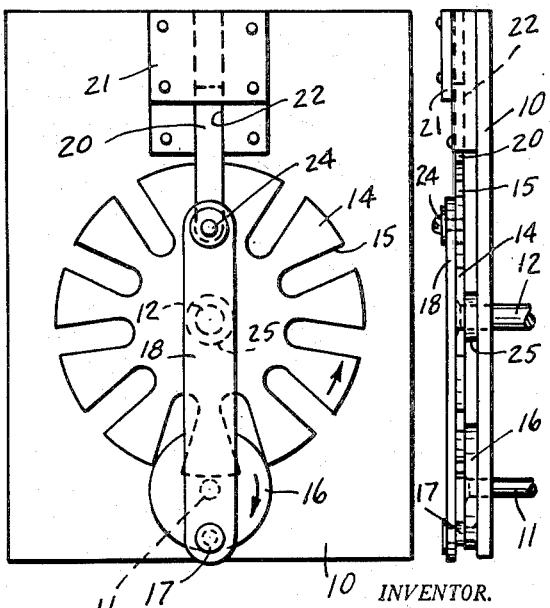
Fig. 5 is a side elevation showing the mechanism in the operative phase illustrated in Fig. 4.

As drive wheel 16 continues its rotation from the position shown in Fig. 3, the connecting rod 18 draws locking bar 20 downwardly into slot 28, locking driven wheel 14 in a fixed position until drive wheel 16 returns to the position shown in Fig. 1, at which time the drive cycle of wheel 14 is repeated.

From the foregoing description it will be apparent that the gear locking mechanism of this invention provides a locking action which is positive and which is accurately synchronized with the wheel driving mechanism. Because of the synchronization, the driven wheel intermittently moves through a predetermined angle and is positively locked between periods of rotation.

This mechanism is not only adapted to operate high speed rotary work feed tables such as those used on machine tools, but it is also applicable to the operation of band switches such as those used in high frequency radio receivers and television receivers for switching from one broadcast frequency band to another. Likewise, the mechanism is also applicable to intermittent motion mechanisms such as those used in motion picture cameras and projectors.

The invention claimed is:

1. A gear locking mechanism comprising a base plate, a driven wheel rotatable with respect thereto and having a plurality of external radial slots disposed at equal angles with respect to one another, a drive wheel mounted on said plate outwardly of said driven wheel and including a drive pin disposed with respect to the slots in said wheel so as to enter one slot after another to successively move said wheel through one predetermined angle after another, a locking bar slideably mounted on said base plate outwardly of said wheel, opposite to said drive wheel and adjacent the periphery of said wheel for reciprocation radially thereof, and a connecting rod pivotally connecting the drive pin of said drive wheel with one end of said locking bar, whereby said drive wheel draws said locking bar into one of the slots of said wheel during periods of disengagement of said drive pin with said slots.

2. A gear locking mechanism comprising a driven wheel having a plurality of radial slots disposed at equal angles with respect to one another, a drive wheel including a drive pin disposed outwardly of said driven wheel with respect to the slots in said driven wheel so as to enter one slot after another to successively move said wheel through one predetermined angle after another, a locking bar slideably mounted outwardly of and adjacent the periphery of said driven wheel for reciprocation radially thereof, and a connecting mechanism pivotally connecting the drive pin of said drive wheel with one end of said locking bar, whereby said drive wheel draws said locking bar into one of the slots of said driven wheel during periods of disengagement of said drive pin with said slots.

References Cited in the file of this patent

FOREIGN PATENTS 338,208    Germany _____ June 13, 1921

OTHER REFERENCES

"Ingenious Mechanisms," copyright 1930 (first ed.), The Industrial Press, New York, N. Y.